United States Patent [19]

Kamiguchi

[11] Patent Number: 4,828,475
[45] Date of Patent: May 9, 1989

[54] DIRECT PRESSURE MOLD CLAMPING APPARATUS FOR AN INJECTION-MOLDING MACHINE

[75] Inventor: Masao Kamiguchi, Houya, Japan

[73] Assignee: Fanuc Ltd., Yamanashi, Japan

[21] Appl. No.: 184,450

[22] PCT Filed: Sep. 17, 1987

[86] PCT No.: PCT/JP87/00688
§ 371 Date: Apr. 13, 1988
§ 102(e) Date: Apr. 13, 1988

[87] PCT Pub. No.: WO88/01930
PCT Pub. Date: Mar. 24, 1988

[30] Foreign Application Priority Data

Sep. 19, 1986 [JP] Japan .................. 61-219745

[51] Int. Cl.⁴ .......................... B29C 45/80
[52] U.S. Cl. ................... 425/150; 425/171; 425/590
[58] Field of Search ........... 425/145, 150, 171, 589, 425/590

[56] References Cited

FOREIGN PATENT DOCUMENTS 51-13495  4/1976  Japan .
55-67433  5/1980  Japan .
55-124632 9/1980  Japan .
59-24311  2/1984  Japan .
60-49853  3/1985  Japan .

Primary Examiner—Jay H. Woo
Assistant Examiner—Timothy W. Heitbrink
Attorney, Agent, or Firm—Staas & Halsey

[57] ABSTRACT

A direct pressure type mold clamping apparatus for an injection-molding machine is capable of performing high speed mold closing and opening operations and of producing a required mold clamping force, without the use of a large sized motor, the mold clamping apparatus being driven by two motors. A movable platen is driven by servomotor at high speed to a die touch position. An error register of a servo circuit is supplied with distributed pulses which correspond to a moving amount from the die touch position to a set mold clamping force producing position. The movable platen is then driven in a mold clamping direction with a greater driving force by an induction motor. Thereafter, pulse signals outputted by a position detector are supplied to the error register corresponding to movement of the movable platen to gradually reduce an error value of the error register. When the error register value is reduced to zero, arrival at the set mold clamping force producing position is determined. Then, the induction motor is braked by a braking system so that the required mold clamping force is produced. Thereafter, the movable platen is driven by the servomotor at high speed in the mold opening direction.

7 Claims, 3 Drawing Sheets

DIRECT PRESSURE MOLD CLAMPING APPARATUS FOR AN INJECTION-MOLDING MACHINE

BACKGROUND OF THE INVENTION

1. Field of the Invention

The present invention relates to a direct-pressure type mold clamping apparatus of an injection-molding machine, which is capable of effecting mold-closing and mold-opening at high speed and of producing a required mold clamping force.

2. Description of the Related Art

An injection-molding machine is furnished with a toggle type mold clamping mechanism, in which a drive source and a movable platen are connected by means of a toggle link, or a direct pressure type mold clamping mechanism. The drive source and the movable platen are connected directly so as to open or close and clamp dies that are attached individually to the movable platen and a stationary platen.

In the mold clamping operation, the dies must be clamped with a great force. Thus, a requisite for the drive source of a mold clamping mechanism is the capability of producing a great clamping force. In the process of injection molding, moreover, the time required for the manufacture of each molding, i.e., the cycle time, is expected to be shortened. Another requisite for the drive source, therefore, is to be able to drive the dies at high speed while they are being opened or closed.

The toggle link acts to help the dies open and close at high speed, and to facilitate the production of a great clamping force. Thus, the toggle type mold clamping mechanism fulfills both of the aforesaid requirements. The direct pressure type mold clamping mechanism, on the other hand, has the advantage over the toggle type mold clamping mechanism that it does not require mold thickness adjustment to compensate for changes in die thickness. It is difficult for the direct pressure type mold clamping mechanism, however, to satisfy both the aforementioned requirements. In the case of a direct-pressure type mold clamping mechanism using a motor as its drive source, for example, both those requirements can be fulfilled only if the motor used has a very large capacity, and therefore, is an expensive one. In consequence, the manufacturing cost of the injection-molding machine increases.

SUMMARY OF THE INVENTION

Accordingly, an object of the present invention is to provide a motor operated, direct pressure type mold clamping apparatus which is capable of performing accurate, high speed mold closing and opening operations and of producing a required mold clamping force, without the use of a special large capacity motor.

In order to achieve the above object, a mold clamping apparatus of an injection-molding machine according to the present invention comprises conversion means which includes a rotating member and a rectilinear motion member movable in unison with a movable platen, the conversion means serving to convert a rotary motion of the rotating member into a rectilinear motion of the rectilinear motion member. The mold clamping apparatus further comprises transmission means for transmitting the rotation of a servomotor to the rotating member, and a speed reducer for reducing the rotating speed and increasing the rotatory force or torque of an induction motor, and transmitting the increased rotatory force to the transmission means. The speed reducer and the transmission means are releasably coupled by means of clutch means.

Further, the mold clamping apparatus comprises numerical control means, position detecting means coupled to the servomotor for detecting the moved position of a movable platen, a servo circuit for driving the servomotor, and torque limit means responsive to a torque limit command from the numerical control means for applying torque limit on the servomotor, the servo circuit including an error register for receiving pulse signals from the position detecting means and distributed pulse signals from the numerical control means. The numerical control means is adapted to supply a torque limit command which causes the servomotor to be substantially inoperative. It also actuates the clutch means when the movable platen, driven by means of the servomotor, reaches a first predetermined position in which dies fitted individually on the movable platen and a fixed platen touch each other. The movable platen is driven substantially only by the induction motor from the first predetermined position to a second position, in which a set mold clamping force is produced. Further, the numerical control means operates to effect pulse distribution corresponding to movement of the movable platen from the first predetermined position to the second predetermined position. Thereafter, the numerical control means determines that the movable platen reaches the second predetermined position, and actuates the braking means to lock the movable platen, when an error amount stored in the error register is reduced to zero. The error value is produced as the servomotor rotates, which accompanies rotation of the induction motor.

Preferably, the numerical control means stops the delivery of the torque limit command and de-energizes the clutch in a mold opening mode, so as to cause the servomotor to drive the movable platen.

Thus, according to the present invention, in a mold clamping mode, the output torque of the induction motor increased by the speed reducer is converted into a driving force for driving the movable platen by the transmission means and the conversion means. The movable platen is moved by the driving force so as to produce a great mold clamping force. In a mold closing or opening mode, the transmission means and the induction motor are disconnected from each other, and the movable platen is moved by means of the servomotor only. Thus, a great mold clamping force can be produced in the mold clamping mode, while the movable platen can be moved accurately and at high speed in the mold closing or opening mode. Thus, no large capacity motor is required. The highly controllable servomotor for mold opening and closing operations is combined with the induction motor for producing mold clamping force, which can easily provide a high output and is relatively low priced. Therefore, an injection-molding machine can be obtained which is economical and high in control accuracy, and has a short cycle time. Furthermore, a drive source for the movable platen need not be a servomotor with a great output torque. In limiting the torque of the servomotor for die protection during the mold closing operation, therefore, an optimum torque limit operation can be achieved even though the resolution of torque limit value setting is low. Since attainment of the set clamping force producing position is determined by monitorinng the error register value, the clamping force can be accurately controlled.

DETAILED DESCRIPTION OF THE PREFERRED EMBODIMENTS

Figure 1:
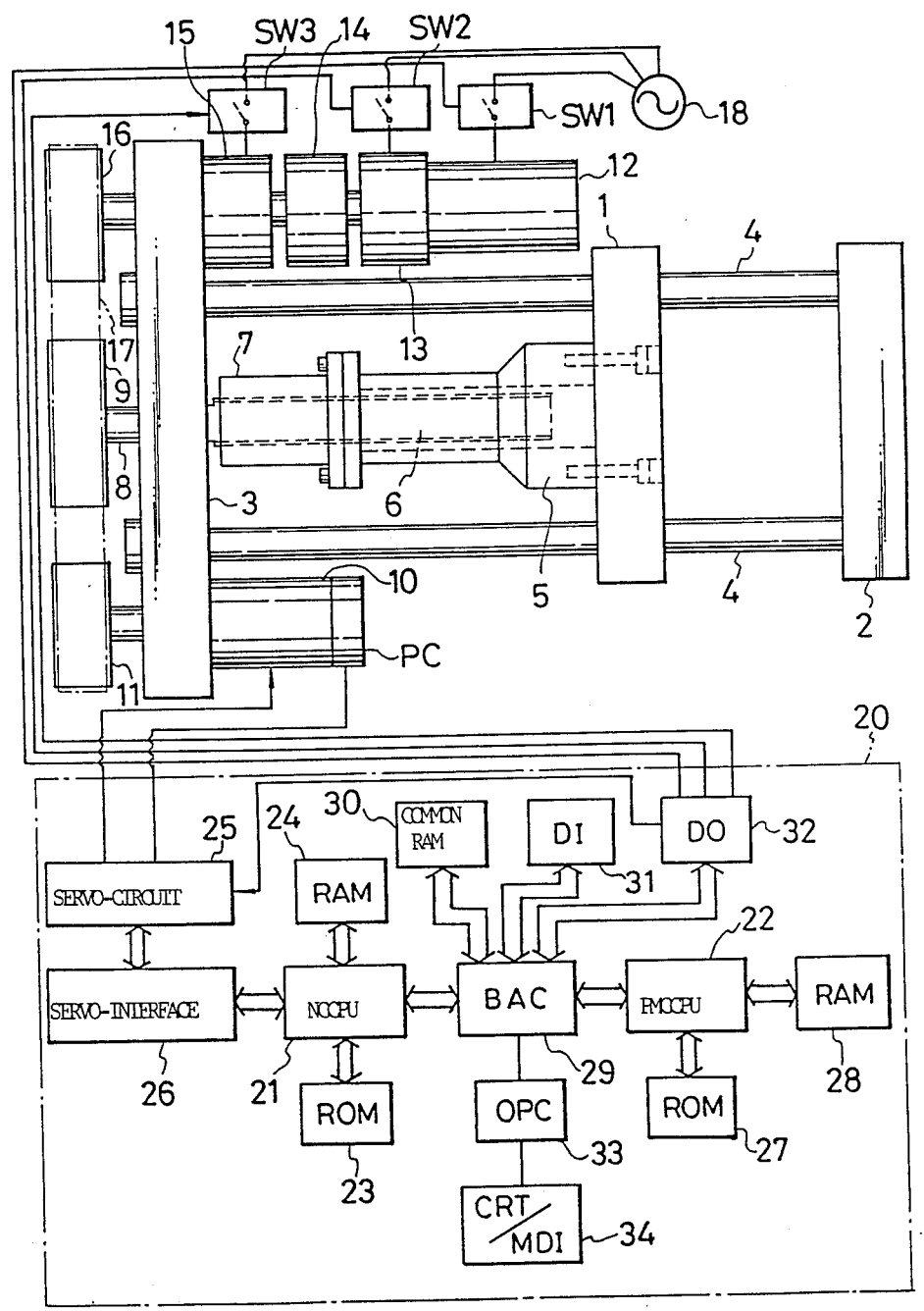
FIG. 1 is a schematic view showing a direct pressure type mold clamping apparatus according to an embodiment of the present invention.
Figure 2:
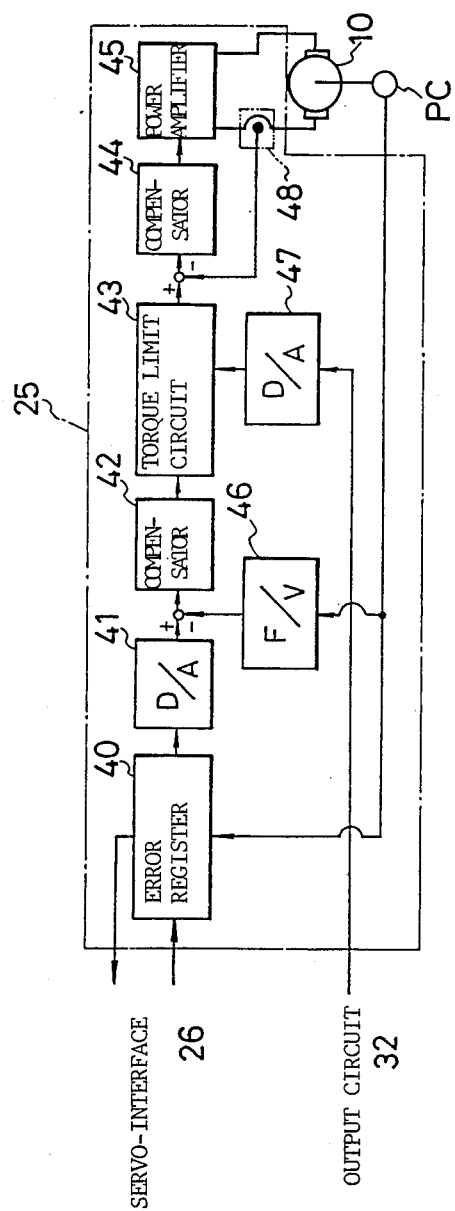
FIG. 2 is a block diagram showing the servo circuit of FIG. 1.

In FIG. 1, numerals 1, 2 and 3 denote a movable platen, a stationary platen, and a rear platen, respectively. The stationary platen 2 and the rear platen 3 are fixed to a base (not shown) of an injection-molding machine. The movable platen 1 is supported by means of four tie bars 4 (two of which are shown) supported at either end by the platens 2 and 3, so as to be movable from side to side, as illustrated, along the tie bars 4. The movable platen 1 and the stationary platen 2 are fitted individually with dies (not shown). A hollow cylindrical nut mounting member 5, extending parallel to the tie bars 4, is fixed to the central portion of the rear-platen-side end face of the movable platen 1. A ball nut 7 is fixed to the distal end of the mounting member 5 so as to be coaxial with the member 5. The mounting member 5 is formed with a through hole extending along the axis thereof. This through hole communicates with a tapped hole of the ball nut 7, and contains a ball screw 6, which threadedly engages the nut 7 to produce axial movement. A shaft 8 integral with the ball screw 6 extends outward through the rear platen 3, and is journaled in the platen 3 with the aid of a thrust bearing and a radial bearing (not shown). A timing gear 9 is fixed to the outer end of the ball screw shaft 8. A servomotor 10 with an absolute position detector PC is fixed to the rear platen 3. A timing gear 11 is fixed to the output shaft of the servomotor 10 which extends outward through the rear platen 3.

An induction motor 12 with a braking system 13 is fixedly connected to the base of the injection-molding machine. The output shaft of the induction motor 12 is coupled to the input shaft of a speed reducer 14, whose output shaft is coupled to the input shaft of a clutch 15. The output shaft of the clutch 15 is journaled in the rear platen 3, and extends outwardly therethrough. A timing gear 16 is fixedly connected to the distal end of the output shaft of the clutch 15. A timing belt 17 is passed between and around the timing gears 9, 11 and 16. Symbols SW1 to SW3 designate switches, which are turned on and off in response to commands from a numerical control unit (hereinafter referred to as NC unit) 20 (described later). The switches connect and disconnect a power source 18 to the induction motor 12, the braking system 13, and the clutch 15.

The NC unit 20 includes a microprocessor (hereinafter referred to as NCCPU) 21 for numerical control and a microprocessor (hereinafter referred to as PMCCPU) 22 for programmable machine control. The NCCPU 21 has an associated ROM 23, which stores a control program for generally controlling the injection-molding machine, and a RAM 24 for tentatively storing various results of arithmetic operations. The NCCPU 21 is also operatively connected, through a servo-interface 26, to servomotors (not shown) for performing injection, screw rotation, ejector operation, etc. NCCPU 21 is also operatively connected to servo-circuit for controlling the drive of the servomotor 10 of the aforementioned mold clamping mechanism. Only the servo-circuit for the servomotor 10 is illustrated and denoted by numeral 25. The PMCCPU 22 is operatively connected to a ROM 27, which stores a sequence control program or the like for the injection-molding machine, and a RAM 28 for temporarily storing the results of arithmetic operations or the like. Moreover, a bus-arbiter controller (hereinafter referred to as BAC) 29, which is operatively interposed between the two CPUs 21 and 22, is connected to a nonvolatile common RAM 30 for storing operation control programs for the injection-molding machine and other programs. BAC is also connected to an input circuit 31, an output circuit 32, and an operator panel controller (hereinafter referred to as OPC) 33. The OPC 33 is connected to a manual input control panel having a CRT display (hereinafter referred to as MDI/CRT) 34. The switches SW1 to SW3 and the servo circuit 25 are connected to the output circuit 32.

In the servo circuit 25, an error register 40 is periodically supplied with a move command signal, constituted by a pulse train and providing an amount of movable platen movement for a given pulse distribution period, from the NCCPU 21 through the servo-interface 26. The servo circuit 25 is also supplied with a pulse train or signal from the position detector PC as the servomotor 10 rotates, so as to store an error signal indicative of the amount of difference between the moving command signal and the position signal. The error signal is converted into an analog voltage, as a speed command value signal, by means of a digital-to-analog converter (hereinafter referred to as D/A converter) 41. A speed feedback is performed to improve a response characteristic of the servo circuit. That is, a voltage obtained by converting a signal from the encoder PC and corresponding to the actual servomotor speed is subtracted from the speed command value signal. The result, i.e., the difference between the command speed signal and the actual speed signal, is amplified in a compensator 42, so as to obtain a torque command signal or a voltage corresponding to a value of current that should flow through the armature of the servomotor 10. Furthermore, a torque limit circuit 43 receives the torque command signal and limits the output torque of the servomotor 10. In order to improve the response with respect to the output of the torque limit circuit 43, the difference between the torque command signal and a feedback voltage signal supplied from a current detector 48 and corresponding to the armature current of the servomotor 10 is amplified by a compensator 44. Moreover, the output of the compensator 44 is amplified by a power amplifier 45 and is then applied to the servomotor 10. Reference numeral 47 designates a D/A converter for converting the torque limit command value signal from the NC unit 20 into an analog signal which is applied to the torque limit circuit 43.

In the meantime, the NCCPU 21 reads out the error value signal of the error register 40 through the servo-interface 26.

Figure 3:
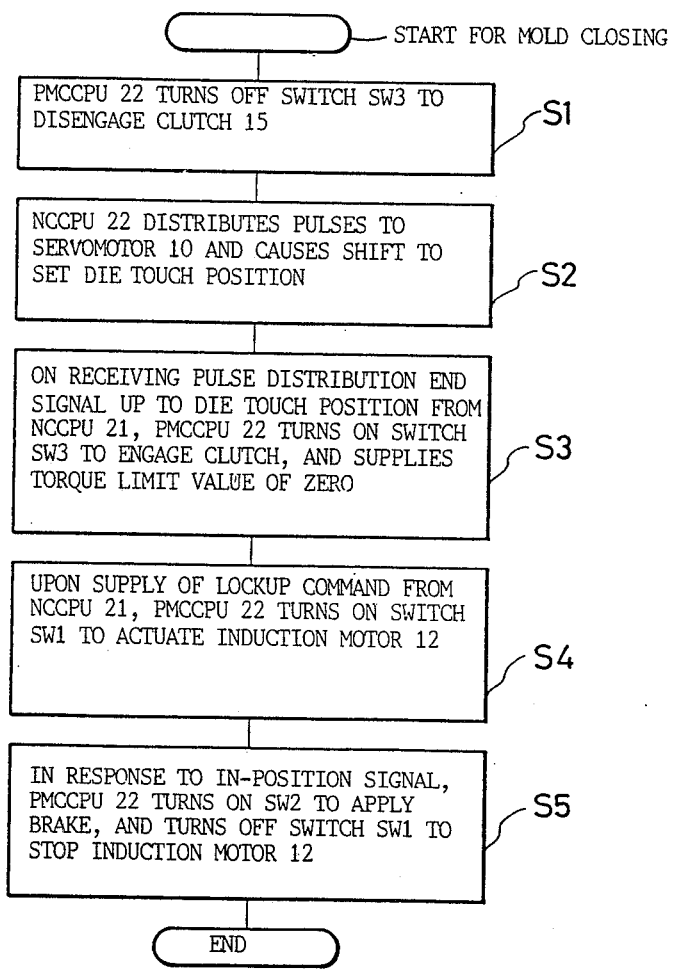
FIG. 3 is a flow chart for illustrating the mold closing and clamping operations of the mold clamping apparatus.

Referring now to FIG. 3, the operation of the mold clamping apparatus with the aforementioned construction will be described. First, mold clamping control parameters, such as a mold opening end position, die protection start position, die touch position, mold clamping force position, mold opening acceleration position, mold opening deceleration position, and die moving speed, are previously set by means of the CRT/MDI 34 using, e.g., macro-variables. At the start of mold closing, the PMCCPU 22 causes the output circuit 32 to turn off the switch SW3, thereby disengaging the clutch 15 (Step S1). Then, the NCCPU 21 performs pulse distribution in accordance with an NC program, to drive the servomotor 10 in a mold closing direction through the medium of the servo-interface 26 and the servo-circuit 25. As the servomotor rotates, the ball screw 6 is caused to rotate by the timing gear 11, the timing belt 17, and the timing gear 9. The movable platen 1 is advanced by means of the ball nut 7 threadedly engaging the ball screw 6. The nut mounting member 5 moves in unison with the ball nut 6 (Step S2). During this step, the timing gear 16 on the output side of the induction motor 12 idles. When the movable platen 1 reaches the die protection start position, the rotation speed of the servomotor 10 is reduced to a die protection speed, and the movable platen 1 is further advanced. Thereafter, when pulse distribution up to the set die touch position is completed with the movement of the movable platen 1, the NCCPU 21 writes a pulse distribution end signal in the common RAM 30.

When the PMCCPU 22 reads this pulse distribution end signal from the common RAM 30, it causes the output circuit 32 to turn on the switch SW3, thereby engaging the clutch 15, and delivers a torque limit of zero so that the output torque of the servomotor 10 is reduced to zero (Step S3). Then, the NCCPU 21 outputs a pulse distribution up to a set mold clamping force producing position, i.e., a lockup position, and to the servocircuit 25. Meanwhile, the PMCCPU 22 causes the output circuit 32 to turn on the switch SW1, thereby driving the induction motor 12 in the mold closing direction (Step S4). The output of the induction motor 12 is reduced in rotating speed and increased in torque by the speed reducer 14, and is then transmitted through the clutch 15 to the timing gear 16, thereby driving this gear. Accordingly, the timing gear 9 fixed to the shaft 8 of the ball screw 6 is driven in the mold closing direction by the timing gear 16 driven by means of the induction motor 12 through the medium of the timing belt 11. Thus, the ball screw 6 is rotated in the mold closing direction with a great torque. As a result, the movable platen 1, which is movable in unison with the ball nut 7 is subjected to a great driving force in the mold closing direction, thus clamping the dies while causing the tie bar 4 to extend.

The error register 40 of the servo circuit 25 is supplied with distributed pulses up to a lockup position, and the value of the error signal of the error register 40 is converted into an analog voltage by the D/A converter 41. Further, a voltage supplied from the F/V converter 46 and indicative of the actual servomotor speed is subtracted from the error register voltage. The difference is supplied to the torque limit circuit 43 through the compensator 42. However, since the torque limit value is set to "0", the output from the torque limit circuit 43 remains "0" and hence the servomotor 10 is substantially de-energized. However, the timing gear 11 fixed to the motor shaft of the servomotor 10 is rotated by means of the timing belt 17 driven by the induction motor 12 and thus the motor shaft of the servomotor 10 is rotated. With this motor rotation, the encoder PC generates feedback pulses to reduce the error value of the error register 40. In this manner, the error value of the error register 40 decreases as the movable platen 1 is moved forwardly. Thereafter, a lockup operation is completed and the error value of the error register 40 is brought to zero. Under these conditions, when an in-position signal is supplied from the servo circuit 25 to the NCCPU 21 through the servo-interface 26, the NCCPU 21 writes a lockup end signal into the common RAM 30. When the PMCCPU 22 reads this lockup end signal, it causes the output circuit 32 to turn on the switch SW2, thereby working the braking system 13 to prevent the induction motor 12 from rotating. As a result, the movable platen 1 is held in the lockup position (representing a set mold clamping force-producing position) by means of the speed reducer 14, clutch 15, timing gear 16, timing belt 17, timing gear 9, ball screw 6, and ball nut 7. At the same time, the PMCCPU 22 causes the output circuit 32 to turn on the switch SW1, thereby stopping the drive of the induction motor 12 (Step S5). Thus, the mold closing and clamping operations are finished.

Thereafter, molten molding resin is injected into the dies and cooled, whereupon mold opening is performed. At the start of the mold opening, the PMCCPU 22 terminates the delivery of the torque limit value signal of "0" and causes the output circuit 32 to turn off the switches SW2 and SW3. This removes the braking action of the braking system 13 and disengages the clutch 15. Meanwhile, the NCCPU 21 drives the servomotor 10 in accordance with the NC program, through the medium of the servo-interface 26 and the servo-circuit 25. This causes the movable platen 1 to retreat at a mold release speed. When the mold opening end position is reached after acceleration and deceleration, the drive of the servomotor 10 is stopped.

In the mold closing and opening modes, as described above, the movable platen 1 is driven by means of the servomotor 10 whose position and speed are controlled by the NC unit 20. Accordingly, the mold closing and opening operations can be performed accurately and at high speed. In the mold clamping mode, the movable platen 1 is driven with the great driving force by the output of the induction motor 12 which is increased by means of the speed reducer 14, so that a great mold clamping force can be obtained.

Thus, the function to produce the mold clamping force and the function to execute the mold closing and opening operations are allotted to the induction motor and the servomotor, respectively. An economical mold clamping apparatus can be obtained without requiring the use of large capacity motors.

Moreover, the servomotor for the mold opening and closing operations requires an output torque of only about 2 to 3 tons. Thus, if the resolution of torque limit value setting is 1/100, the output torque of the servomotor can be controlled in blocks of about 20 to 30 kg, so that die protection can be achieved. When performing the mold opening and closing operations and the mold clamping operation by means of one motor, on the other hand, the motor used must produce the maximum output torque of about 100 tons. Thus, the motor output torque cannot be reduced to about 1 ton or less, and die protection is difficult.

I claim:

1. A direct pressure mold clamping apparatus for an injection-molding machine having a fixed platen and a movable platen, each platen having a die connectable thereto, said direct pressure mold clamping apparatus comprising:

a rotatable member and a rectilinear motion member movable in unison with said movable platen;

conversion means for converting rotary motion of said rotatable member into rectilinear motion of said rectilinear motion member;

a servomotor operatively connected to said rotatable member and generating a rotational force;

an induction motor operatively connected to said rotatable member and having a rotating speed and generating torque;

transmission means for transmitting the rotational force of said servomotor to said rotatable member;

a speed reducer connected to said induction motor for reducing the rotating speed and increasing the torque of said induction motor, and transmitting the increased torque to said transmission means;

clutch means, interposed between said speed reducer and said transmission means, for releasably coupling said speed reducer to said transmission means;

braking means for braking said induction motor;

position detecting means coupled to said servomotor for detecting the moved position of the movable platen and outputting a signal indicative of the speed of said servomotor;

numerical control means coupled to said position detecting means, said induction motor, said clutch means, and said braking means for outputting control signals to said numerical control means including a servo circuit for driving said servomotor, said servo circuit including an error register for receiving a pulse signal from said position detecting means and a distributed pulse speed command signal from said numerical control means and outputting an error signal based on a difference between the speed command signal and the servomotor speed signal;

said numerical control means for outputting a torque limit command signal which stops operation of the servomotor, and for actuating said clutch means when the movable platen, driven by said servomotor, reaches a first predetermined position in which said dies of the movable platen and the fixed platen touch each other, the movable platen being driven by said induction motor from the first predetermined position to a second position at which a set mold clamping force is produced;

said numerical control means outputting a pulse distribution corresponding to movement of the movable platen from the first predetermined position to the second predetermined position; and said numerical control means determining when the movable platen reaches the second predetermined position, and actuating said braking means to lock the movable platen when the error signal of said error register is reduced to zero, the error signal being produced as said servomotor rotates, accompanying the rotation of the induction motor.

2. A direct pressure mold clamping apparatus according to claim 1, wherein said numerical control means actuates said servomotor after completion of mold clamping and moves the movable platen from the second predetermined position to a third predetermined position in which mold opening ends.

3. A direct pressure type mold clamping apparatus according to claim 1, wherein said rectilinear motion member is a ball nut, and said rotating member is a ball screw mating with said ball nut.

4. A direct pressure type mold clamping apparatus according to claim 1, wherein said transmission means includes timing gears fixedly connected individually to an output shaft of said speed reducer, an output shaft of said servomotor, and said rotating member, and a timing belt passed between and around said timing gears.

5. A direct pressure type mold clamping apparatus according to claim 2, wherein said rectilinear motion member is a ball nut, and said rotatable member is a ball screw mating with said ball nut.

6. A direct pressure type mold clamping apparatus according to claim 2, wherein said transmission means includes timing gears fixedly connected individually to an output shaft of said speed reducer, an output shaft of said servomotor, and said rotating member, and a timing belt passed between and around said timing gears.

7. A direct pressure mold clamping apparatus for an injection-molding machine, comprising:

a movable platen;

drive means connected to the movable platen for moving the movable platen in closing and opening directions;

a servomotor operatively connected to the drive means;

an induction motor operatively connected to the drive means;

control means for outputting a move command signal to drive the servomotor in a mold closing direction, a signal for stopping the servomotor upon reaching a die touch position, and a signal for driving the induction motor after stopping the servomotor to produce a mold clamping force; and position detector means connected to the servomotor for outputting a position signal indicative of the position of the servomotor to the control means, the control means including an error register for outputting an error signal based on a difference between the position signal and the movement command signal for the servomotor.

* * * * *